US012603195B2

(12) United States Patent
Lohan et al.

(10) Patent No.: US 12,603,195 B2
(45) Date of Patent: Apr. 14, 2026

(54) SYSTEMS AND METHODS FOR COOLING AN ELECTRIC CHARGING CABLE

(71) Applicant: Toyota Motor Engineering & Manufacturing North America, Inc., Plano, TX (US)

(72) Inventors: Danny Lohan, Northville, MI (US); Shailesh Joshi, Ann Arbor, MI (US); Ercan Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 176 days.

(21) Appl. No.: 18/466,303

(22) Filed: Sep. 13, 2023

(65) Prior Publication Data

US 2025/0087386 A1      Mar. 13, 2025

(51) Int. Cl.
*B60L 53/18* (2019.01)
*B60L 53/302* (2019.01)
*H01B 7/02* (2006.01)
*H01B 7/42* (2006.01)

(52) U.S. Cl.
CPC .............. *H01B 7/423* (2013.01); *B60L 53/18* (2019.02); *B60L 53/302* (2019.02); *H01B 7/02* (2013.01)

(58) Field of Classification Search
CPC . H01B 7/02; H01B 7/42; H01B 7/421; H01B 7/422; H01B 7/423; H01B 7/424–7/428; H01B 9/02; B60L 50/60; B60L 53/16; B60L 53/18; B60L 53/62; B60L 53/302

USPC .... 174/19, 20, 21 R, 22 R, 36, 102 R–121 R
See application file for complete search history.

(56) References Cited

U.S. PATENT DOCUMENTS

| | | | |
|---|---|---|---|
| 11,571,978 B2 * | 2/2023 | Shabgard | H01B 7/423 |
| 2017/0144558 A1 * | 5/2017 | Remisch | B60L 53/18 |
| 2018/0277283 A1 * | 9/2018 | Remisch | B60L 53/16 |
| 2020/0231060 A1 * | 7/2020 | Matsuyama | B60L 53/62 |
| 2020/0395147 A1 * | 12/2020 | Shabgard | H01B 7/425 |
| 2021/0358657 A1 * | 11/2021 | Shabgard | B60L 53/18 |

FOREIGN PATENT DOCUMENTS

| | | |
|---|---|---|
| CN | 209822333 U | 12/2019 |
| CN | 107640046 B | 9/2020 |
| CN | 210984369 U | 10/2020 |
| CN | 212570517 U | 2/2021 |
| CN | 115440430 A | 6/2022 |
| CN | 218333225 U | 1/2023 |

* cited by examiner

*Primary Examiner* — William H. Mayo, III
(74) *Attorney, Agent, or Firm* — Dinsmore & Shohl LLP

(57) ABSTRACT

The present disclosure is directed to systems and methods for cooling an electric charging cable. The system includes a conductor core, a wick placed around an exterior of the conductor core, an outer cover surrounding the wick, wherein the outer cover comprises an inner surface, and wherein a space is formed between the wick and the inner surface of the outer cover, and one or more channels disposed within the space between the wick and the inner surface of the outer cover and coupled to the wick, wherein the one or more channels includes an outer surface and wherein the outer surface of the one or more channels is placed a distance from the inner surface of the outer cover.

18 Claims, 6 Drawing Sheets

SYSTEMS AND METHODS FOR COOLING AN ELECTRIC CHARGING CABLE

FIELD

The present disclosure relates to systems and methods for cooling an electric charging cable.

TECHNICAL BACKGROUND

Charging cables, such as those used for charging electric vehicles, may allow for the passage of large amounts of electricity between a power source and a battery. These charging cables can generate significant heat which requires cooling in order to keep the charging cables within their optimal operating temperature range. Further, these charging cables may need to be configured to be used in both slow charging and fast charging modes, which may generate a different amount of heat and have different cooling requirements. Conventional cooling systems can involve passing a cooling fluid along a conducting core of the charging cable to cool the charging cable.

SUMMARY

Charging cables generate heat during operation. Further, charging cables may operate in both slow charging and fast charging modes and may generate different amounts of heat in the different modes. In order to operate effectively, charging cables should be maintained within an ideal operating temperature range. Thus, charging cables should be cooled. Oftentimes charging cables may have a conductor core surrounded by an outer cover. Cooling fluid may be pumped between the conductor core and the outer cover. Conventional systems may pump a constant volume of fluid around the conductor core. This may create flow instability as the fluid boils and vapor is created within the charging cable. Further, this may create pressure drop along the length of the charging cable as the fluid travels further away from a pump moving fluid along the charging cable. Further, this may create uneven cooling along the cable surface. Therefore, there exists a need for a charging cable cooling system which can mitigate the flow instability, pressure drop, and uneven cooling with conventional charging cable cooling systems.

The present system can be a more efficient charging cable cooling system than conventional charging cable cooling systems by utilizing channels, a fluid annulus, and/or a spiral fluid pathway to direct cooling fluid to cool the charging cable.

The system generally includes a charging cable including a conductor core, a wick, and an outer cover. Channels or spiral pathways may be coupled to the wick which surrounds the conductor core. Further, a space may be formed between the wick and the outer cover. Cooling fluid may be pumped by a pump through the channels, spiral pathways, and/or space. The flow of cooling fluid from the pump may be controlled by a valve. The cooling fluid may be cooled by a heat exchanger. At least some of the channels and/or spiral pathways may be closed to cooling fluid such that vapor may be passed through the wick to the channels and/or spiral pathways. This can provide the advantage of less pressure drop, less flow disruption, and more even temperature distribution along the charging cable compared to conventional charging cable cooler systems.

According to one embodiment, an electric charging cable includes a conductor core, a wick placed around an exterior of the conductor core, an outer cover surrounding the wick, wherein the outer cover comprises an inner surface, and wherein a space is formed between the wick and the inner surface of the outer cover, and one or more channels disposed within the space between the wick and the inner surface of the outer cover and coupled to the wick, wherein the one or more channels includes an outer surface and wherein the outer surface of the one or more channels is placed a distance from the inner surface of the outer cover.

According to another embodiment, an electric charging cable includes a conductor core, a wick placed around an exterior of the conductor core, an outer cover surrounding the wick, wherein the outer cover comprises an inner surface, and wherein a space is formed between the wick and the inner surface of the outer cover, and a plurality of dividers placed between the wick and the inner surface of the outer cover, such that the space is divided by the dividers into a plurality of zones, wherein each of the zones includes a spiral pathway between an inlet of the space and an outlet of the space.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of the present disclosure may be better understood when read in conjunction with the following drawings in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to a charging cable cooling system which provides for structures to pass a cooling fluid over a conductor core of the charging cable. The charging cable cooling system may include one or more channels to allow vapor to vent from the charging cable cooling system. Further, the charging cable cooling system may have an annulus of cooling fluid surrounding the channels. In other embodiments, the charging cable cooling system may have a plurality of spiral pathways which transfer cooling fluid within the charging cable. In other embodiments, the charging cable cooling system may have a pump, a valve, and a controller to control the flow of cooling fluid within the charging cable.

Conventional charger cable cooling systems may result in increased pressure drop inside of the charging cable as cooling fluid is pumped through the charging cable compared to the pressure drop of the present system. Further, conventional charger cable cooling systems may result in flow instability across the length of the charging cable. Embodiments can more evenly distribute cooling fluid within the charger cable compared to conventional cooling systems. The present system can also reduce pressure drop within the charger cable compared to conventional cooling systems.

Figure 1:
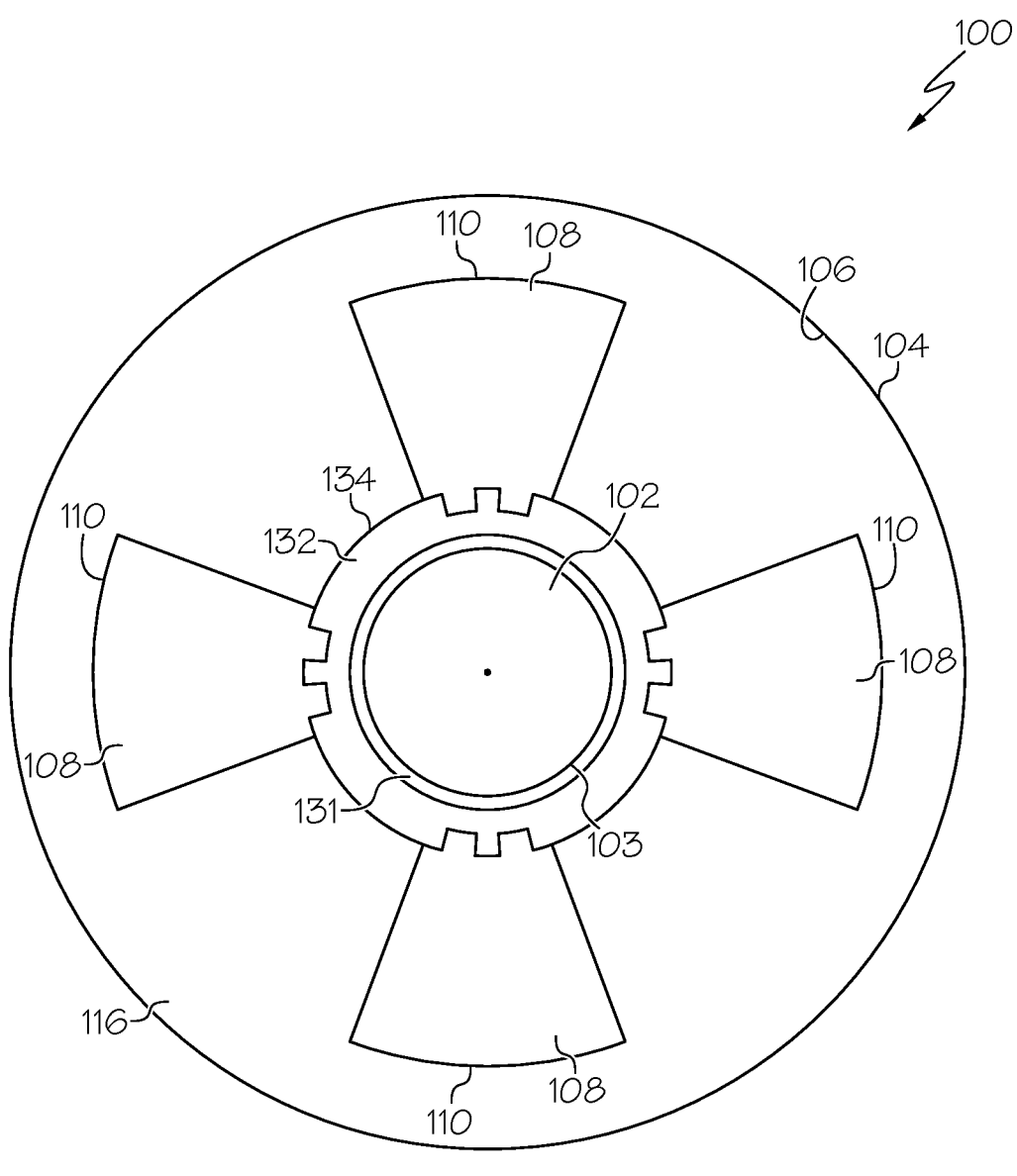
FIG. 1 schematically depicts a top view of a charging cable according to one or more embodiments shown and described herein.

Referring now to FIG. 1, an embodiment of a top view of a charging cable 100 is shown. The charging cable 100 includes a conductor core 102. The conductor core 102 may transfer electricity, such as from a power source to a battery. The conductor core 102 may be any suitable material for conducting electricity, including but not limited to copper, aluminum, steel, or any other suitable materials. While the conductor core 102 is shown as a solid wire, it should be understood that the conductor core 102 may be twisted wire or any other suitable arrangement for conducting electricity. The conductor core may have any suitable cross-sectional shape, including but not limited to a circle, a rectangle, a hexagon, an oval, or any other suitable shape. The conductor core 102 may have any suitable cross-sectional size, including but not limited to six gauge or larger diameter wire. The conductor core 102 may have an outer surface 103. The charging cable 100 may have any suitable adapters on each end (not shown) such that the charging cable 100 may plug into batteries and/or power sources to be used for charging or otherwise used for the transfer of electricity.

An insulation layer 131 may be placed over conductor core 102. The insulation layer 131 may be any suitable material, including but not limited to ethylene propylene rubber (EPR), cross-linked polyethylene (XLPE), or any other suitable material. In embodiments where a dielectric cooling fluid is used, as will be described in more detail herein, there may not be an insulation layer 131 placed over the conductor core 102.

A wick 132 is placed around the insulation layer 131. The wick 132 may be a porous coating or layer which draws a cooling fluid towards the conductor core 102. The wick 132 may be any suitable material, including but not limited to copper, aluminum, stainless steel, or any other suitable material. The wick 132 may include an outer surface 134. The wick 132 may include one or more serrations on the outer surface 134. The serrations may allow for additional surface area of the wick 132 compared to a wick without serrations. However, it should be understood that in embodiments, the wick 132 may not have serrations.

In embodiments not illustrated where no insulation layer 131 is used, the wick 132 may be placed around the outer surface 103 of the conductor core 102.

One or more channels 108 are coupled to the outer surface 134 of the wick 132. The channels 108 are spaced from one another such that at least a portion of the outer surface 134 of the wick 132 does not have a channel 108 coupled thereto. The channels 108 may align with the serrated portions of the wick 132 such that the serrations are contained within the channels 108. The channels 108 have an outer surface 110. The channels 108 may be made of any suitable material, including but not limited to aluminum or steel. The channels 108 may have any suitable cross-sectional shape, including but not limited to trapezoidal, rectangular, semi-circular, or any other suitable cross-sectional shape. While four channels 108 are illustrated, it should be understood that in embodiments there may be any suitable number of channels 108, including but not limited to one channel, two channels, three channels, five channels, ten channels, or any other suitable number of channels.

The charging cable 100 includes an outer cover 104. The outer cover 104 includes an inner surface 106. The outer cover 104 surrounds the conductor core 102. The outer cover 104 may be any suitable material, including but not limited to aluminum or steel.

A space 116 is formed between the inner surface 106 of the outer cover 104, the outer surface 134 of the wick 132, and the outer surface 110 of the channels 108. A cooling fluid may be deposited within the space 116. The cooling fluid may be any fluid suitable for cooling a charging cable, including but not limited to a water-glycol mix, a dielectric fluid, or any other suitable fluid.

The cooling fluid may be disposed within a space 116 between the inner surface 106 of the outer cover 104 and not disposed within the channels 108. Cooling fluid may be absorbed by the wick 132 and evaporated by the conductor core 102. The vaporized cooling fluid may pass through the wick 132 and into the channels 108. The channels 108 may allow for the passage of vaporized cooling fluid. By separating the liquid cooling fluid from the vaporized cooling fluid, flow imbalance and pressure drop within the charging cable 100 may be reduced. This may be advantageous during high load operation of the charging cable 100, such as during fast charging applications. In other embodiments, cooling fluid may be disposed within the channels 108 such that cooling fluid is placed within the entire area between the outer cover 104 and the wick 132.

In embodiments, there is a gap between the outer surface 110 of the channels 108 and the inner surface 106 of the outer cover 104, such that an annulus of cooling fluid surrounds the channels 108. The annulus of cooling fluid may reduce pressure drop along the length of the charging cable 100. While the charging cable 100 is illustrated with an annulus of cooling fluid surrounding the channels 108, it should be understood that in embodiments there may be no annulus of cooling fluid surrounding the channels 108, such that the outer surface 110 of the channels 108 may contact the inner surface 106 of the outer cover 104.

The charging cable 100 may be arranged in any suitable environment for the passage of electricity, including but not limited to charging electric vehicles, power lines, power plants, data centers, or any other suitable environment with variable power load systems.

Figure 2:
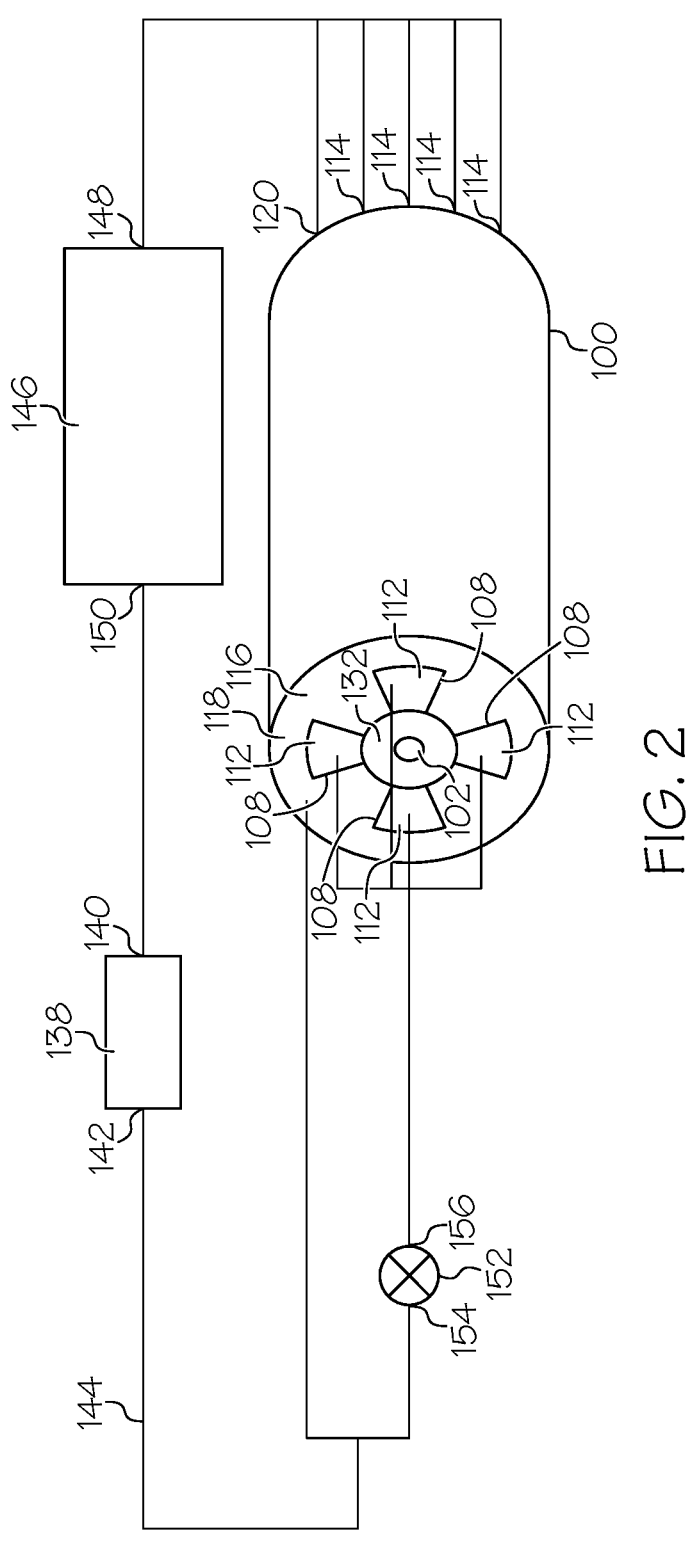
FIG. 2 schematically depicts a charging cable cooling system according to one or more embodiments shown and described herein.
Figure 2:

Referring now to FIG. 2, an embodiment of a charging cable cooling system 10 is shown. The charging cable cooling system 10 includes a charging cable 100.

A pump 138 may circulate the cooling fluid around the charging cable cooling system 10. The pump 138 may have an inlet 140 and an outlet 142. The pump 138 may circulate fluid through a fluid transport line 144. The inlet 140 and the outlet 142 of the pump 138 may be coupled to the fluid transport line 144. A heat exchanger 146 may cool the cooling fluid. The heat exchanger 146 may have an inlet 148 and an outlet 150. The inlet 148 and the outlet 150 of the heat exchanger 146 may be coupled to the fluid transport line 144. The heat exchanger 146 may be cooled by any suitable cooling system, including but not limited to geothermal cooling wherein a condenser cooling fluid from the geothermal system is moved from below the ground underneath the facility and the condenser cooling fluid from the geothermal system is passed across the heat exchanger 146 to cool the fluid passing through the heat exchanger 146. The heat exchanger 146 may also be cooled by radiative cooling wherein condenser cooling fluid is moved across a radiative cooling panel which may be a panel of high solar reflectance and with a high thermal radiation heat transfer rate such that the condenser cooling fluid is cooled, and the condenser cooling fluid is then passed across the heat exchanger 146. The heat exchanger 146 may also be cooled by any other appropriate cooling mechanism.

A valve 152 may control the flow of the cooling fluid within the fluid transport line 144. The valve 152 may include an inlet 154 and an outlet 156. The inlet 154 and the outlet 156 of the valve may be coupled to the fluid transport line 144. The valve 152 may be any suitable type of valve for controlling fluid flow, including but not limited to a gate valve, a ball valve, a butterfly valve, a globe valve, or any other suitable type of valve. The valve 152 may be operable between a plurality of positions, including but not limited to a fully open position, a fully closed position, and a partially open position. In some embodiments, the valve 152 may be manually operable between the various positions, such as with a handle or knob coupled to the valve 152. In other embodiments, the valve 152 may be electronically operable between the various positions, such as by a stepper motor coupled to the valve 152.

The channels 108 includes an inlet 112 and an outlet 114. The space 116 includes an inlet 118 and an outlet 120. The fluid transport line 144 is coupled to the inlet 118 of the space 116 and the fluid transport line 144 is fluidly coupled to the inlet 112 of the channels 108. In embodiments, the fluid transport line 144 may include multiple branches, such that one branch may flow towards the inlet 118 of the space 116 and another branch may flow through the valve 152 towards the channels 108.

The fluid transport line 144 is coupled to the outlet 120 of the space 116 and the fluid transport line 144 is coupled to the outlet 114 of the channels 108. In embodiments, the fluid transport line 144 may include multiple branches, such that one branch is fluidly coupled to the outlet 120 of the space 116 and another branch is fluidly coupled to the outlet 114 of the channels 108. The various branches of the fluid transport line 144 may merge with one another.

In embodiments when the valve 152 is in an open position, cooling fluid may enter the channels 108 such that cooling fluid completely fills the charging cable 100 surrounding the wick 132. In embodiments when the valve 152 is in a closed position, cooling fluid may not enter the channels 108 such that vaporized cooling fluid may pass through the channels 108.

Figure 3:
FIG. 3 schematically depicts a charging cable cooling system with a controller according to one or more embodiments shown and described herein.

Referring now to FIG. 3, an embodiment of the charging cable cooling system 10 is shown. The charging cable cooling system 10 may include a controller 160 which includes a processor 162, a user interface 164, and a non-transitory, processor-readable storage medium 166. The non-transitory, processor-readable storage medium 166 may also be referred to as the memory of the controller 160. The user interface 164 may be for example a touch screen, a keypad, a mobile computing device, or any other suitable user interface.

The charging cable cooling system 10 further may include a temperature sensor 168. The temperature sensor 168 may be coupled to the conductor core 102. While a single temperature sensor 168 is shown, it should be understood that any number of temperature sensors 168 may be included. In some embodiments, there may be a plurality of temperature sensors 168 coupled to the conductor core 102 such that the plurality of temperature sensors 168 may monitor the temperature of the conductor core 102 in multiple places along the conductor core 102. The temperature sensor 168 further is coupled to the controller 160. The temperature sensor 168 may generate an electronic signal corresponding to the detected temperature of the conductor core 102. The temperature sensor 168 may transmit the electronic signal to the controller 160. The controller 160 may compare the electronic signal corresponding to the detected temperature to a threshold temperature stored on the non-transitory, processor-readable storage medium 166. The controller 160 may be coupled to the pump 138 and the controller 160 may be coupled to the valve 152. If the detected temperature exceeds the threshold temperature, the processor 162 of the controller 160 may send a signal to the pump 138 to activate the pump 138 to pump cooling fluid. In some embodiments, the pump 138 may be a variable speed pump. The controller 160 may vary the speed of the pump 138 in response to the electronic signal corresponding to the detected temperature in order to more precisely control the flow of the cooling fluid to maintain the conductor core 102 at a preferred operating temperature. The controller 160 further may deactivate the pump 138 if the controller 160 determines cooling fluid is no longer needed at the conductor core 102.

Further, if the detected temperature exceeds the threshold temperature, the processor 162 of the controller 160 may send a signal to the valve 152 to close the valve 152 to allow vaporized cooling fluid to enter the channels 108. The valve 152 may be coupled to a stepper motor or other suitable mechanism that may open the valve at various opening positions.

In another embodiment, an operator may enter a specified temperature into the user interface 164 of the controller 160. The controller 160 may store the specified temperature in the non-transitory, processor-readable storage medium 166. If the detected temperature exceeds the specified temperature, the processor 162 of the controller 160 may send a signal to the pump 138 to initiate pumping cooling fluid, or the controller 160 may send a signal to the valve 152 to open the valve 152 a prescribed amount.

The controller 160 may also be coupled to an amperage sensor 170. The controller 160 may be configured to monitor the amperage passed through the conductor core 102, such that the amperage sensor 170 transmits an electronic signal corresponding to the amperage level passed through the conductor core 102. The controller 160 may compare the electronic signal corresponding to amperage level to a threshold amperage level stored on the non-transitory, processor-readable storage medium 166. If the detected amperage level exceeds the threshold amperage level, the processor 162 of the controller 160 may send a signal to the pump 138 to pump cooling fluid. In some embodiments, the pump 138 may be a variable speed pump. The controller 160 may vary the speed of the pump 138 in response to the electronic signal corresponding to the detected amperage level in order to more precisely control the flow of the cooling fluid in response to the detected amperage level.

Further, if the detected power consumption level exceeds the threshold power consumption level, the processor 162 of the controller 160 may send a signal to the valve 152 to close the valve 152 to allow vaporized cooling fluid to enter the channels 108. The valve 152 may be coupled to a stepper motor or other suitable mechanism that may open the valve 152 at various opening positions.

In another embodiment, an operator may enter a specified amperage level into the user interface 164 of the controller 160. The controller 160 may store the specified amperage level in the non-transitory, processor-readable storage medium 166. If the detected amperage level exceeds the specified amperage level, the processor 162 of the controller 160 may send a signal to the valve 152 to close the valve 152 to allow vaporized cooling fluid to enter the channels 108.

Figure 4:
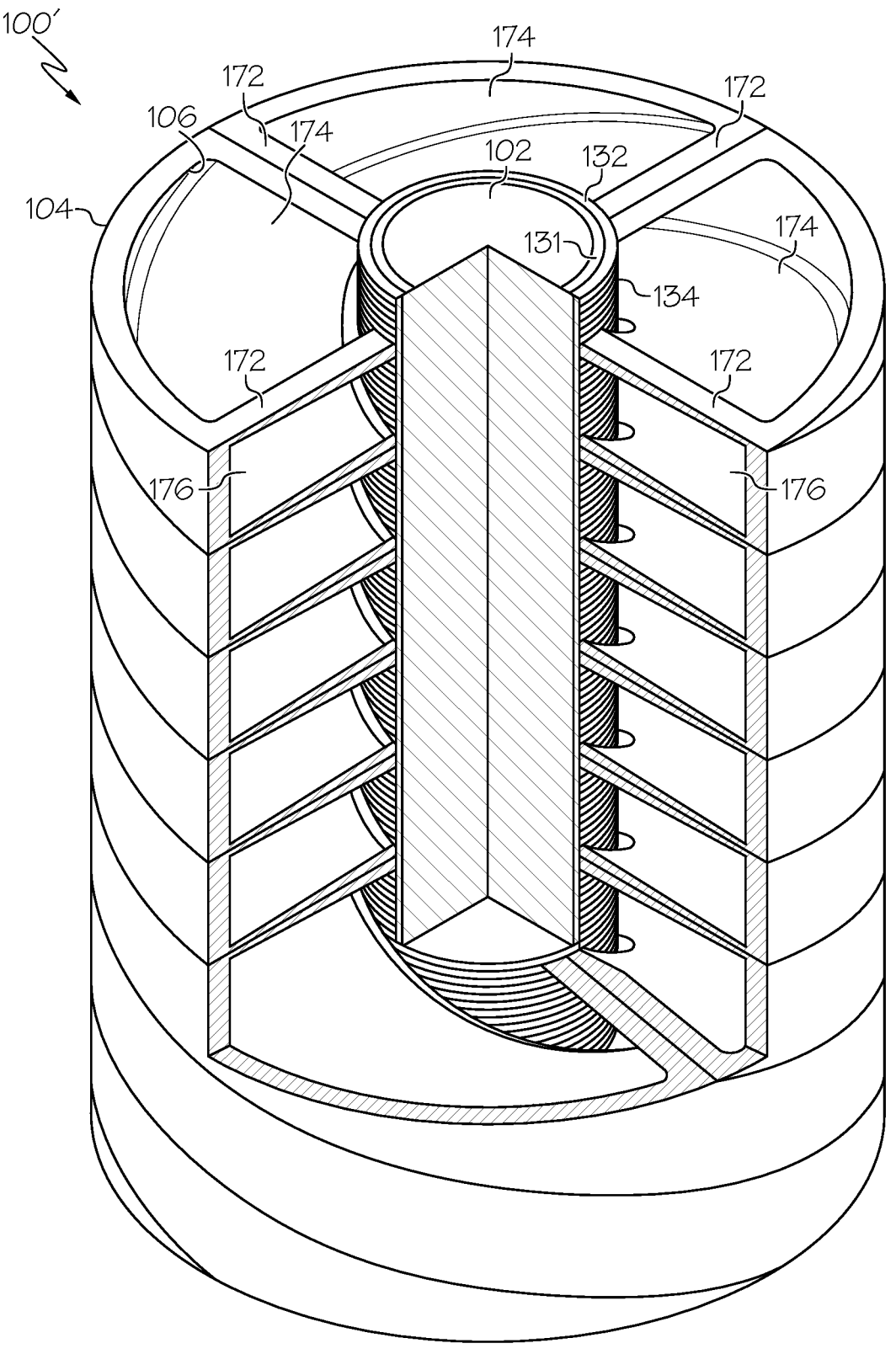
FIG. 4 schematically depicts a partial section view of a charging cable with a spiral formation according to one or more embodiments shown and described herein.

Referring now to FIG. 4, an embodiment of a top view of a charging cable 100' is shown. The charging cable 100' has a plurality of dividers 172 placed between the outer surface 134 of the wick 132 and the inner surface 106 of the outer cover 104. The dividers 172 may segment the space 116 into a plurality of zones 174. Each of the zones 174 includes a spiral pathway 176 which runs along the entire length of the charging cable 100'. However, it should be understood that in embodiments the spiral pathways 176 may run along only a portion of the length of the charging cable 100'. The spiral pathway 176 may be rotated about an axis through the centerline of the conductor core 102. Each spiral pathway 176 may be an independent flow path such that the material in one spiral pathway 176 may not interact with the material in another spiral pathway 176. The spiral pathways 176 may allow cooling fluid to be passed along the conductor core 102 over a longer pathway compared to a straight pathway while traversing the same distance along the conductor core 102. The spiral pathways 176 may also more uniformly distribute cooling fluid along the conductor core 102 compared to a straight pathway.

Figure 5:
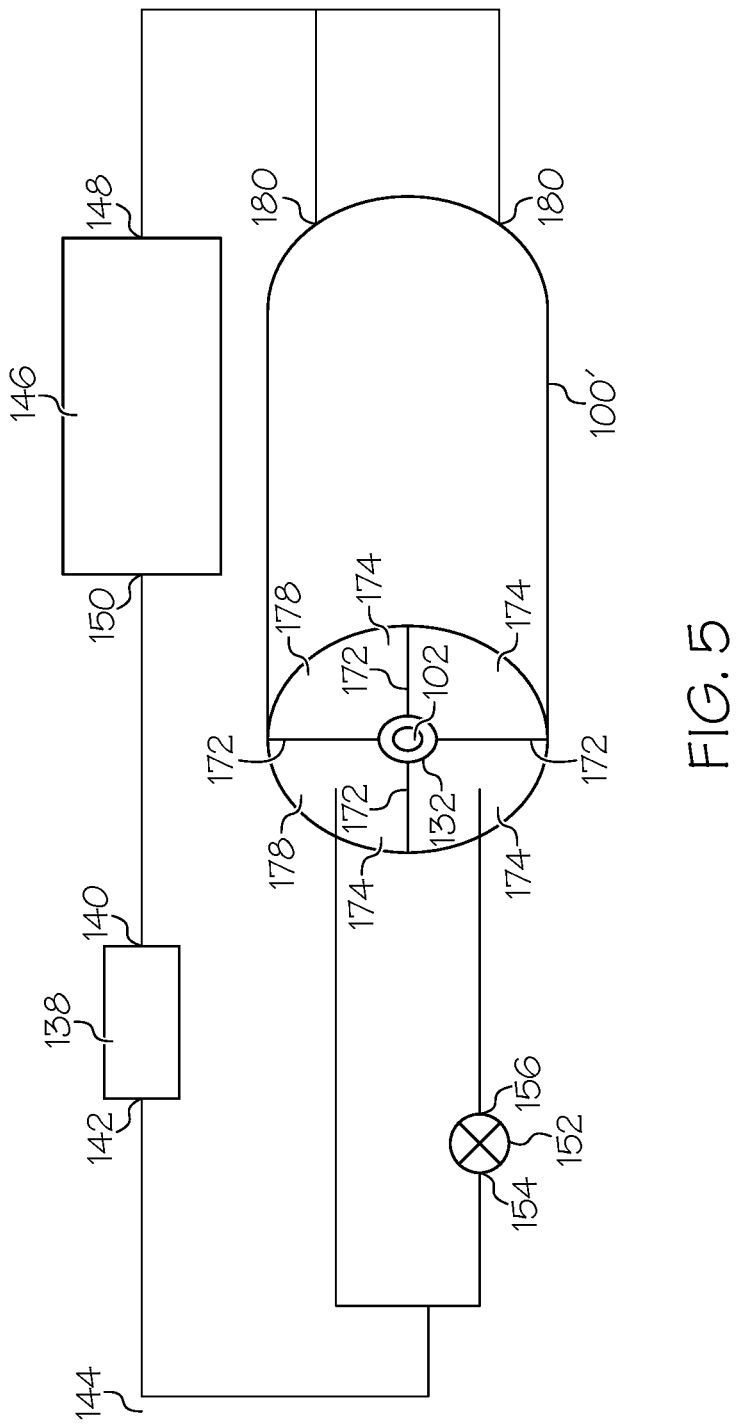
FIG. 5 schematically depicts a charging cable cooling system with a spiral formation according to one or more embodiments shown and described herein.
Figure 5:

Referring now to FIG. 5, an embodiment of the charging cable cooling system 10' is shown. A pump 138 may circulate the cooling fluid around the charging cable cooling system 10'. The pump 138 may circulate fluid through a fluid transport line 144. A heat exchanger 146 may cool the cooling fluid. A valve 152 may control the flow of the cooling fluid within the fluid transport line 144.

Each spiral pathway 176 may have an inlet 178 and an outlet 180. The inlet 178 and the outlet 180 of each spiral pathway 176 may be coupled to the fluid transport line 144. In embodiments, the fluid transport line 144 may include multiple branches, such that one branch is fluidly coupled to the inlet 178 of one spiral pathway 176 and another branch of the fluid transport line 144 is fluidly coupled to the inlet 178 of another spiral pathway 176. The various branches of the fluid transport line 144 may merge with one another.

The valve 152 may be fluidly coupled to at least one of the spiral pathways 176. When the valve 152 is in a closed position, cooling fluid does not enter every spiral pathway 176, such that a portion of spiral pathways 176 not coupled to the valve 152 allow for the passage of cooling fluid and a portion of spiral pathways 176 coupled to the valve 152 allow for vaporized cooling fluid to be vented from the wick 132.

In embodiments not illustrated when the valve 152 is in an open position, cooling fluid may enter all of the spiral pathways 176 such that cooling fluid completely fills the charging cable 100 surrounding the wick 132.

Figure 6:
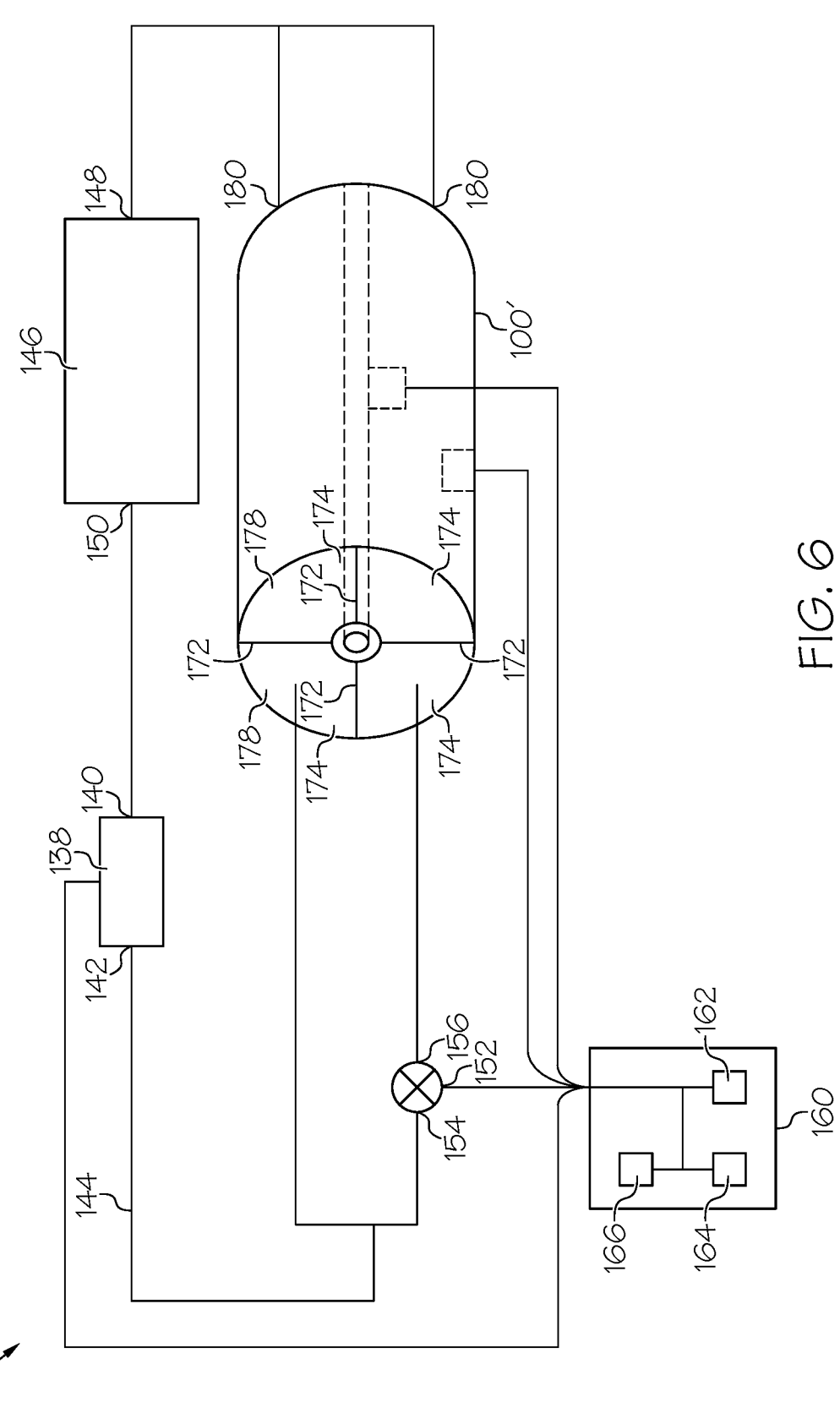
FIG. 6 schematically depicts a charging cable cooling system with a spiral formation and a controller according to one or more embodiments shown and described herein.

Referring now to FIG. 6, an embodiment of the charging cable cooling system 10' is shown. The charging cable cooling system 10' may include a controller 160 which includes a processor 162, a user interface 164, and a non-transitory, processor-readable storage medium 166. The charging cable cooling system 10' further may include a temperature sensor 168. The temperature sensor 168 may be arranged in a similar manner to that described in reference to the charging cable cooling system 10. The temperature sensor 168 may generate an electronic signal corresponding to the detected temperature of the conductor core 102. The temperature sensor 168 may transmit the electronic signal to the controller 160. The controller 160 may process the electronic signal generated by the temperature sensor 168 in a similar manner to that described in reference to the charging cable cooling system 10. The controller 160 may be coupled to the pump 138 and the controller 160 may be coupled to the valve 152. If the detected temperature exceeds the threshold temperature, the processor 162 of the controller 160 may send a signal to the pump 138 to activate the pump 138 to pump cooling fluid. In some embodiments, the pump 138 may be a variable speed pump. The controller 160 may vary the speed of the pump 138 in response to the electronic signal corresponding to the detected temperature in order to more precisely control the flow of the cooling fluid to maintain the conductor core 102 at a preferred operating temperature. The controller 160 further may deactivate the pump 138 if cooling fluid is no longer needed at the conductor core 102.

Further, if the detected temperature exceeds the threshold temperature, the processor 162 of the controller 160 may send a signal to the valve 152 to close the valve 152 to allow vaporized cooling fluid to enter a spiral pathway 176. The valve 152 may be coupled to a stepper motor or other suitable mechanism that may open the valve 152 at various opening positions.

The controller 160 may also be coupled to an amperage sensor 170. The controller 160 may be configured to monitor the amperage passed through the conductor core 102, such that the amperage sensor 170 transmits an electronic signal corresponding to the amperage level passed through the conductor core 102. The controller 160 may compare the electronic signal corresponding to amperage level to a threshold amperage level stored on the non-transitory, processor-readable storage medium 166. If the detected amperage level exceeds the threshold amperage level, the processor 162 of the controller 160 may send a signal to the pump 138 to pump cooling fluid. In some embodiments, the pump 138 may be a variable speed pump. The controller 160 may vary the speed of the pump 138 in response to the electronic signal corresponding to the detected amperage level in order to more precisely control the flow of the cooling fluid in response to the detected amperage level.

Further, if the detected power consumption level exceeds the threshold power consumption level, the processor 162 of the controller 160 may send a signal to the valve 152 to close the valve 152 to allow vaporized cooling fluid to enter the channels 108. The valve 152 may be coupled to a stepper motor or other suitable mechanism that may open the valve 152 at various opening positions.

In another embodiment, an operator may enter a specified amperage level into the user interface 164 of the controller 160. The controller 160 may store the specified amperage level in the non-transitory, processor-readable storage medium 166. If the detected amperage level exceeds the specified amperage level, the processor 162 of the controller 160 may send a signal to the valve 152 to close the valve 152 to allow vaporized cooling fluid to enter the channels 108.

Accordingly embodiments of the present disclosure provide a charging cable cooling system which may more effectively control pressure drop and flow stability across the charging cable. Particularly, a charging cable has one or more channels surrounding a wick placed around a conductor core. Cooling fluid may be placed inside the charging cable and absorbed by the wick. After the cooling fluid is vaporized by the heat of the conductor core, the vaporized cooling fluid may pass through the channels. In embodiments, the system includes a pump and a valve to move fluid through the charging cable and control the flow of fluid through the channels. In embodiments, the system includes a controller, a temperature sensor, and/or an amperage sensor to automatically control the flow of fluid through the conductor core based on detected temperature and/or amperage of the conductor core. In embodiments, the system includes a plurality of spiral pathways to pass fluid along the conductor core.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in casings where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. An electric charging cable comprising:
a conductor core;
a wick placed around an exterior of the conductor core;
an outer cover surrounding the wick, wherein the outer cover comprises an inner surface, and wherein a space is formed between the wick and the inner surface of the outer cover and is operable to receive a cooling fluid;
one or more channels disposed within the space between the wick and the inner surface of the outer cover and coupled to the wick;
a pump fluidly coupled to the space between the conductor core and the outer cover and fluidly coupled to the one or more channels; and
a valve coupled to the pump and fluidly coupled to the one or more channels, wherein the valve is operable between a closed position and an open position, wherein:
the one or more channels is operable to receive one or more of vapor and a cooling fluid, wherein the cooling fluid is disposed within the space between the conductor core and the outer cover,
the one or more channels comprises an outer surface,
the outer surface of the one or more channels is placed a distance from the inner surface of the outer cover, and
at least one first portion of the wick is fluidly coupled to the space and at least one second portion of the wick is fluidly coupled to the one or more channels.

2. The electric charging cable of claim 1, wherein the electric charging cable is configured to charge an electric vehicle.

3. The electric charging cable of claim 1, further comprising a heat exchanger fluidly coupled to the space between the conductor core and the outer cover and fluidly coupled to the one or more channels and to the pump.

4. The electric charging cable of claim 1, further comprising a controller operable to activate and deactivate the pump.

5. The electric charging cable of claim 1, further comprising a controller operable to open and close the valve.

6. The electric charging cable of claim 5, further comprising a temperature sensor, wherein the temperature sensor is arranged to monitor temperature of the conductor core and the temperature sensor is coupled to the controller.

7. The electric charging cable of claim 5, further comprising an amperage sensor, wherein the amperage sensor is arranged to monitor amperage through the conductor core and the amperage sensor is coupled to the controller.

8. The electric charging cable of claim 1, further comprising an insulation layer placed between the wick and an outer surface of the conductor core.

9. An electric charging cable comprising:
a conductor core;
a wick placed around an exterior of the conductor core
an outer cover surrounding the wick, wherein the outer cover comprises an inner surface, and wherein a space is formed between the wick and the inner surface of the outer cover; and
a plurality of dividers placed between the wick and the inner surface of the outer cover, such that the space is divided by the plurality of dividers into a plurality of zones, wherein each of the zones comprises a spiral pathway between an inlet of the space and an outlet of the space.

10. The electric charging cable of claim 9, wherein the electric charging cable is configured to charge an electric vehicle.

11. The electric charging cable of claim 9, further comprising a cooling fluid disposed within the space between the conductor core and the outer cover.

12. The electric charging cable of claim 9, further comprising:
a pump fluidly coupled to the spiral pathways; and
a valve fluidly coupled to the pump and fluidly coupled to at least one of the spiral pathways, wherein the valve is operable between a closed position and an open position.

13. The electric charging cable of claim 12, further comprising a heat exchanger fluidly coupled to the spiral pathways and fluidly coupled to the pump.

14. The electric charging cable of claim 12, further comprising a controller operable to activate and deactivate the pump.

15. The electric charging cable of claim 12, further comprising a controller operable to open and close the valve.

16. The electric charging cable of claim 15, further comprising a temperature sensor, wherein the temperature sensor is arranged to monitor temperature of the conductor core and the temperature sensor is coupled to the controller.

17. The electric charging cable of claim 15, further comprising an amperage sensor, wherein the amperage sensor is arranged to monitor amperage through the conductor core and the amperage sensor is coupled to the controller.

18. The electric charging cable of claim 9, further comprising an insulation layer placed between the wick and an outer surface of the conductor core.

* * * * *